United States Patent [19]

Typpo et al.

[11] 4,107,606
[45] Aug. 15, 1978

[54] NON-CONTACTING ELECTROMAGNETIC THICKNESS GAUGE FOR SHEET MEASUREMENT HAVING IMPROVED SMALL DISTANCE SENSITIVITY

[75] Inventors: Pekka Matti Typpo; Gunnar Wennerberg, both of Cupertino, Calif.

[73] Assignee: Measurex Corporation, Cupertino, Calif.

[21] Appl. No.: 819,469

[22] Filed: Jul. 27, 1977

Related U.S. Application Data

[63] Continuation-in-part of Ser. No. 750,390, Dec. 14, 1976, abandoned.

[51] Int. Cl.$^2$ ............................................. G01R 33/12
[52] U.S. Cl. ................................................... 324/229
[58] Field of Search ................... 324/34 TK, 229, 230, 324/231

[56] References Cited

U.S. PATENT DOCUMENTS

| | | | |
|---|---|---|---|
| 1,946,924 | 2/1934 | Allen et al. | 324/34 TK |
| 2,563,254 | 8/1951 | Lewis | 324/34 TK |
| 3,528,002 | 9/1970 | Dunlavey | 324/34 TK |
| 3,696,290 | 10/1972 | Dreckmann et al. | 324/34 TK |

FOREIGN PATENT DOCUMENTS

| | | | |
|---|---|---|---|
| 394,654 | 1/1974 | U.S.S.R. | 324/34 TK |

*Primary Examiner*—Robert J. Corcoran
*Attorney, Agent, or Firm*—Ronald L. Yin

[57] ABSTRACT

A caliper gauge for measuring the thickness of a sheet has a transmitter generating a magnetic field on one side of the sheet and a receiver detecting the amplitude of the magnetic field on the other side of the sheet. Both the transmitter and receiver are maintained at a constant distance from the sheet. The transmitter comprises an electrical wire wound a plurality of times about a cylindrically shaped body of a magnetically susceptible material. The receiver also comprises a cylindrically shaped body with an electrical wire wound a plurality of times about it. The transmitter is positioned such that the axis of the cylindrical body is substantially perpendicular to the sheet. The receiver is positioned such that the axis of the cylindrical body is substantially aligned with the axis of the transmitter.

5 Claims, 7 Drawing Figures

NON-CONTACTING ELECTROMAGNETIC THICKNESS GAUGE FOR SHEET MEASUREMENT HAVING IMPROVED SMALL DISTANCE SENSITIVITY

This application is a continuation-in-part of our application, Ser. No. 750,390, entitled A Method and Apparatus for Measuring the Thickness of a Body, filed on Dec. 14, 1976, now abandoned.

BACKGROUND OF THE INVENTION

The present invention relates to an apparatus for measuring the thickness of a sheet and, more particularly, to an apparatus employing the principle of mutual inductance to measure the thickness of a sheet of non-magnetic material.

Caliper gauges, or more generally, apparatuses to measure the thickness of a sheet, where typically the sheet is a material such as paper, are well-known in the art (see for example U.S. Pat. No. 2,665,333). However, heretofore electromagnetic caliper gauges have been of the type known as self-inductance (see also for example U.S. Pat. No. 3,528,002). Self inductance gauges, in general, comprise a coil of wire wrapped about a U-shaped member of a magnetically susceptible material on one side of the sheet to be measured. A current is passed through the coil creating a magnetic field. On the other side of the sheet is a bar also of a magnetically susceptible material. Both the bar and the coil are maintained at a constant distance from the sheet, through the use of well-known techniques, such as air bearings. Since the coil and the bar are maintained at a constant distance from the sheet, the separation between the coil and the bar is determined by the thickness of the sheet. As the thickness of the sheet varies, the separation between the coil and the bar would also vary. The measurement of the separation between the coil and the bar is based on the principle of self-inductance.

The coil acts similar to an inductor. A capacitor is placed in series with the coil. As is well-known from basic circuit theory, a capacitor in series with an inductor would resonate at a frequency determined by the factor $1/(\sqrt{LC})$. The coil, however, does not act similar to an inductor with a constant value for its inductance. As the distance between the coil and the bar changes, so does the inductance of the coil. Thus, the resonating frequency of the capacitor in series with the coil is determined by the inductance of the coil, which is determined by the separation between the coil and the bar. The measurement of the resonating frequency would give a measurement for the separation of the coil and the bar. Therefore, the resonating frequency of the circuit gives a measure of the thickness of the sheet. While self-inductance caliper gauges are adequate for some applications, using resonating frequency as a measurement of thickness, they are inadequate for measurement of sheets having large thickness values.

The use of the amplitude of a magnetic field as a measurement of the thickness of a sheet is disclosed in U.S. Pat No. 3,696,290. That patent, however, teaches the use of a u-shaped permanent magnet and a magneto resistor. The u-shaped magnet suffers from the disadvantage that it is not axially symmetrical and thus it is subject to alignment error. Furthermore, unlike an electromagnet whose amplitude can be varied, the amplitude of a permanent magnet cannot be adjusted for varying thicknesses of different sheets, as the gauge is being used.

SUMMARY OF THE INVENTION

A caliper gauge for measuring the thickness of a sheet of a non-magnetic material comprises a transmitter to one side of said sheet. The transmitter has a body of a magnetically susceptible material, substantially cylindrical in shape, with an electrical wire wound a plurality of times about said body. The transmitter is held at a constant distance apart from the sheet, such that the axis of the cylinder is substantially perpendicular to the sheet. A receiver is to the other side of said sheet. The receiver also comprises a body of a magnetically susceptible material, substantially cylindrical in shape. An electrical wire is wound a plurality of times about the receiver. The receiver is positioned such that the axis of the cylinder is substantially aligned with the axis of the transmitter.

DETAILED DESCRIPTION OF THE DRAWINGS

Figure 1:
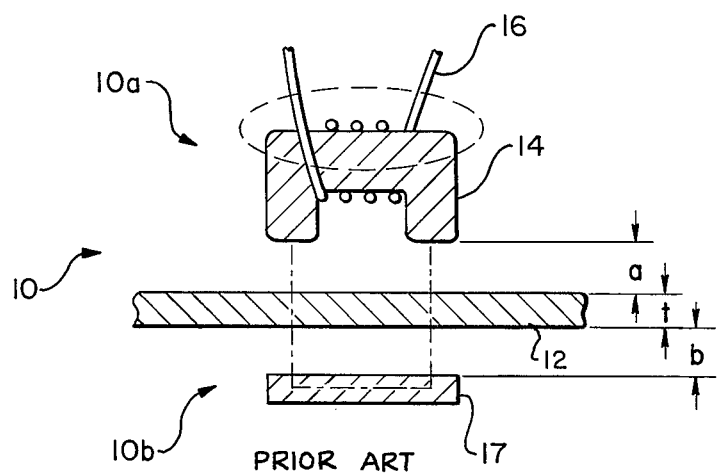
FIG. 1 is a cross-sectional view of the caliper gauge of the prior art.

Referring to FIG. 1, there is shown a cross-sectional view of the thickness gauge 10 of the prior art, measuring the thickness $t$ of a sheet 12. Typically the sheet 12 is a material such as paper, plastics, rubber, etc. The thickness gauge 10 comprises two parts, a first part 10a and a second part 10b. The first part 10a is positioned to one side of the sheet 12 with the second part 10b positioned to other side of the sheet 12. The first part 10a comprises a u-shaped member 14 of a magnetically susceptible material, such as iron. Wound around the u-shaped member 14 is a wire 16. The second part 10b is a bar member 17 also of a magnetically susceptible material. In the operation of the thickness gauge 10, both the first part 10a and the second part 10b are maintained at a constant distance apart from the sheet 12. The first part 10a is maintained at a constant distance $a$ from the sheet 12 by well known techniques, such as air bearings (not shown). The second part 10b is also held at a constant distance $b$ from the sheet 12 by well known techniques. The total separation between the first part 10a and the second part 10b is the sum of the distances $a$, $b$ and the thickness $t$ of the sheet 12. In the operation of the thickness gauge 10, a capacitor (not shown) is connected in series with the wire 16. The wire 16 wound about u-shaped member 14 acts as an inductor. As is well known, an inductor and a capacitor would resonate at a frequency determined by $1/\sqrt{LC}$, where L is the inductance and C is the capacitance. In the thickness gauge 10 of the prior art, the inductance of the wire 16 wound around the u-shaped member 14 is determined by the total distance (i.e. $a + t + b$) between the u-shaped member 14 and the bar 17. As the distance between the first part 10a and the second part 10b increased, so would the resonating frequency.

Figure 2:
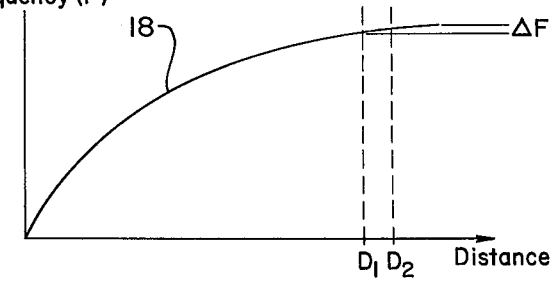
FIG. 2 is a graph of distance versus frequency for the caliper gauge of the prior art.

FIG. 2 is a graph of the typical response of distance versus resonating frequency of the thickness gauge 10 of the prior art.

Figure 3:
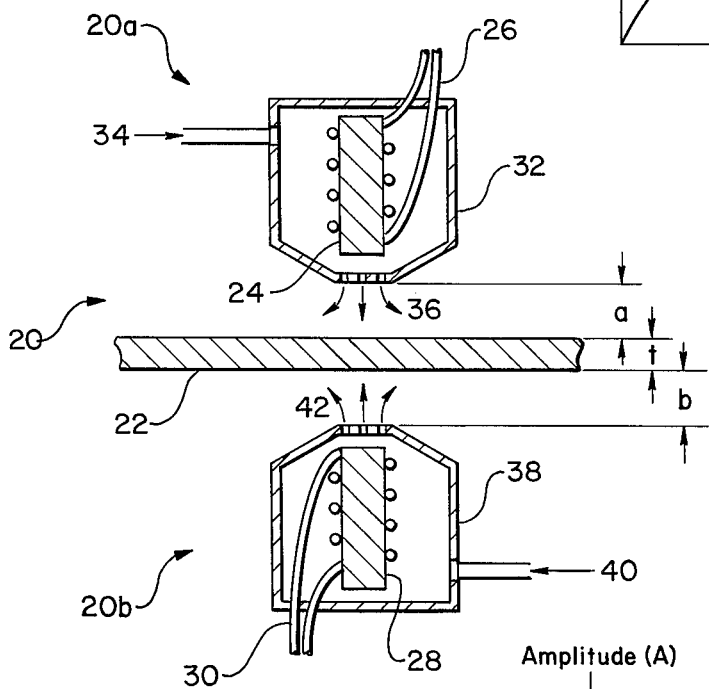
FIG. 3 is a cross-sectional view of an embodiment of the caliper gauge of the present invention.

Referring to FIG. 3, there is shown a cross-sectional view of a caliper gauge 20 of the present invention, measuring the thickness $t$ of a sheet 22. Typically, the sheet 22 is a material, such as paper, plastics, rubber, etc. The caliper gauge 20 comprises two parts, a transmitter 20a and a receiver 20b. The transmitter 20a is positioned to one side of the sheet 22 with the receiver 20b positioned to other side of the sheet 22. The transmitter 20a comprises a first member 24, substantially cylindrical in shape, of a magnetically susceptible material, such as iron. Wound around the first member 24 is a first wire 26. The transmitter 20a is positioned such that the axis of first member 24 is substantially perpendicular to the sheet 22. The receiver 20b comprises a second member 28, substantially cylindrical in shape, also of a magnetically susceptible material. Wound around the second member 28 is a second wire 30. The member 20b is positioned such that the axis of the second member 28 is substantially aligned with the axis of the first member 24.

In the operation of the caliper gauge 20, the transmitter 20a is maintained at a constant distance $a$ from the sheet 22, while the receiver 20b is held at a constant distance $b$ from the sheet 22. In the embodiment shown in FIG. 3, this is accomplished by placing the transmitter 20a in a first housing 32. The first housing 32 has an input port 34 and an output port 36, comprising a plurality of tiny orifices. A fluid, such as pressurized air, enters the first housing 32 through the input port 34. The air exits from the first housing 32 via the output port 36. The fluid exits from the first housing 32, under pressure, impinges the one side of the sheet 22. By directing a constant flow of fluid from the first housing 32 impinging on the sheet 22, the first housing 32, with the transmitter 20a in it, would be maintained at a constant distance $a$ from the sheet 22. Similarly, the receiver 20b is placed in a second housing 38. The second housing 38 has an input port 40 and an output port 42, comprising a plurality of tiny orifices. A fluid, such as pressurized air, enters the second housing 38 through the input port 40. The air exits from the second housing 38 via the output port 42, under pressure, impinges the other side of the sheet 22. By directing a constant flow of fluid from the second housing 38 impinging on the sheet 22, the second housing 38, with the receiver 20b in it, would be maintained at a constant distance $b$ from the sheet 22.

The total separation between the transmitter 20a and the receiver 20b is the sum of the distances $a$, $b$ and the thickness $t$ of the sheet 22. A current is passed through the first wire 26 generating a magnetic field with an amplitude from the transmitter 20a. The amplitude of the magnetic field generated from the transmitter 20a is detected by the receiver 20b. The intensity of the magnetic field or the amplitude received at the receiver 20b is a function of the total separation between the transmitter 20a and the receiver 20b. As the distance between the transmitter 20a and the receiver 20b increased, the amplitude of the magnetic field sensed at the receiver 20b would decrease. A plot of a typical distance versus amplitude is shown in FIG. 4.

Figure 4:
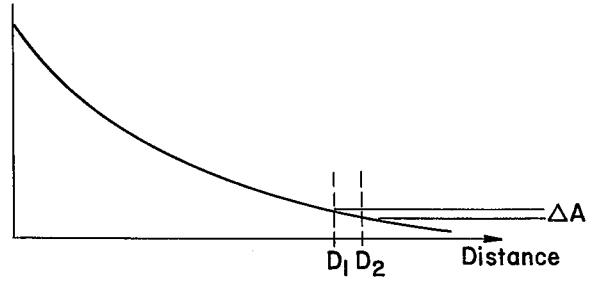
FIG. 4 is a graph of distance versus amplitude for the caliper gauge of the present invention.

One of the advantages of the caliper gauge 20 of the present invention can be seen by comparing FIG. 2 to FIG. 4. For small changes in distance where the separation between the caliper gauge 20 or the thickness gauge 10 is large (such as from $D_1$ to $D_2$, where $D_1$ and $D_2$ are the same for FIGS. 2 and 4), it is seen that the incremental change in signal (i.e. $\Delta F$ and $\Delta A$) is also small. However, though the incremental change in $\Delta A$ for the caliper gauge 20 is small, it is seen that the proportional change in the total signal, i.e. $\Delta A/A$, is large compared to the proportional change in the total signal ($\Delta F/F$) of the thickness gauge 10. The larger proportional change of the total signal ($\Delta A/A$) of the caliper gauge 20 of the present invention results in a larger signal to noise ratio resulting in a more accurate measurement.

A second advantage of the caliper gauge 20 of the present invention can be seen by referring back to FIG. 1. It is well known that magnetic flux flow along the path of least resistance. One such path is the dotted line; another is the dot-dash line. Where the path flows through magnetically susceptible material (such as through the bar 17) the reluctance is virtually zero. The reluctance through air, however, is non-zero. If the separation between the U-shaped member 14 and the bar 17 is large and length of the path shown by the dotted line is short in comparison, then the magnetic flux would have a preference to flow along the dotted path. However, to operate the thickness gauge 10 the magnetic flux must flow along the dash-dot path. Thus, where the distance to be measured is large, the physical dimension of the U-shaped member 14 must also be large. In the caliper gauge 20 of the present invention, the physical dimensions of the gauge 20 need not be increased to detect separation of large distances. Since the caliper gauge 20 measurex the thickness of the sheet through the detection of the amplitude of the magnetic field, for measurement of thick sheets only the amplitude of the field of the caliper gauge 20 needs to be increased. This can be accomplished by simply increasing the amount of current flowing through the electrical wire of the transmitter 20a.

Compared to the gauge disclosed in U.S. Pat. No. 3,696,290, the caliper gauge 20 of the present invention offers the advantage that the amplitude of the magnetic field can be varied as the gauge 20 is used to measure sheets having varying thickness values. Furthermore, the axial symmetry of the gauge 20 offers the advantage of ease of alignment.

Figure 5:
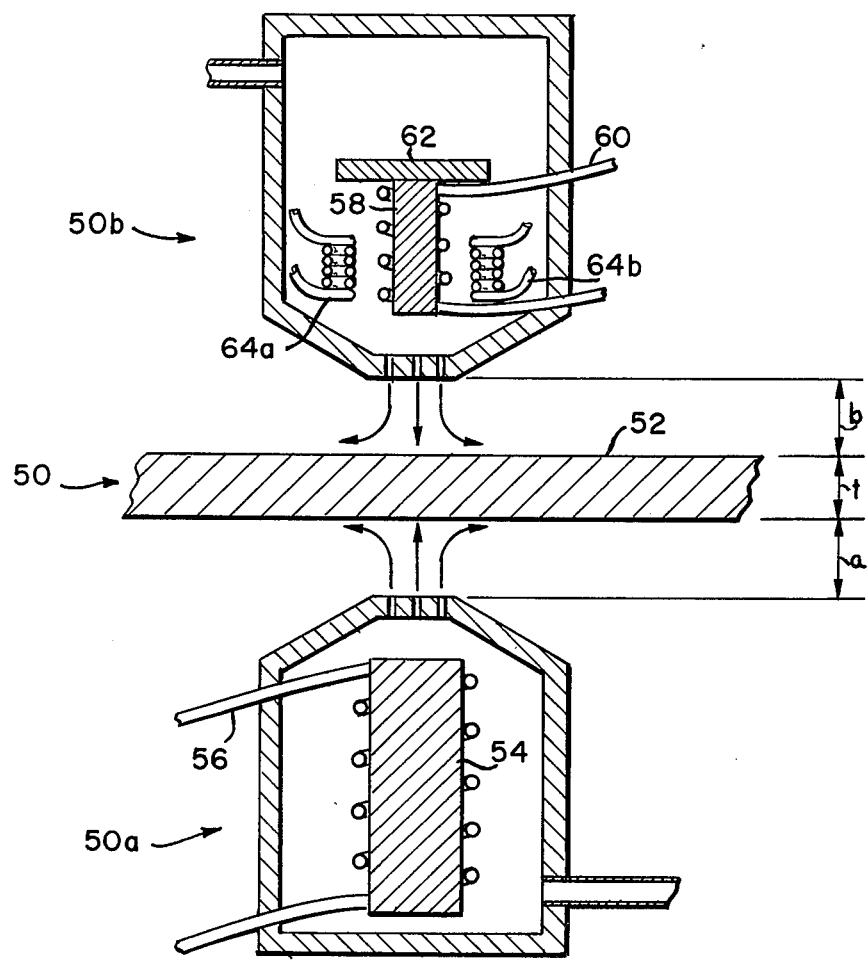
FIG. 5 is a cross-sectional view of another embodiment of the caliper gauge of the present invention.

Referring to FIG. 5 there is shown another caliper gauge of the present invention, generally designated as 50. The caliper gauge 50 comprises a transmitter 50a and a receiver 50b. The transmitter 50a is positioned to one side of a sheet 52, with the receiver 50b positioned to other side of the sheet 52. The transmitter 50a comprises a first member 54, substantially cylindrical in shape, of a magnetically susceptible material, such as iron. Wound around the first member 54 is a first wire 56. The transmitter is positioned such that the axis of first member 54 is substantially perpendicular to the sheet 52. The transmitter 50a is the same as the transmitter 20a of FIG. 3. The receiver 50b comprises a second member 58, substantially cylindrical in shape, also of a magnetically susceptible material. Wound around the second member 58 is a second wire 60. The second member 58 is positioned such that its axis is substantially aligned with the axis of the first member 54. The receiver 50b also comprises a disk shaped member 62, of a magnetically susceptible material. The disk shaped member 62 is attached to the second member 58, with the center of the disk 62 substantially aligned with the axis of the second member 58. The second member 58 is between the sheet 52 and the disk 62. Preferably, as will be explained hereafter, the diameter of the disk 62 is approximately the same as the diameter of the first member 54 and the diameter of the second member 58 is less than the diameter of the disk 62. Except for the addition of the disk 62, the receiver 50*b* is the same as the receiver 20*b* of FIG. 3.

In the embodiment shown in FIG. 5, there is also a first pair 64 of sensors 64*a* and 64*b*, each capable of detecting the amplitude of a magnetic field. Each of the sensors 64*a* and 64*b* comprises a coil of electrical wire. The second member 58 is positioned between the first pair 64 and forms a line with the first pair 64. A second pair 66 of sensors (not shown) also capable of detecting the amplitude of a magnetic field (e.g. each is a coil of electrical wire) is positioned such that the second member 58 is between the second pair 66 and forms a line with the second pair 66. The line formed by the second pair 66 is approximately perpendicular to the line formed by the first pair 64. The first pair 64 and the second pair 66 are used for alignment purpose, i.e. to ensure and to correct for any deviation of signal caused by the lateral displacement of the first member 54 and the second member 58 from one another. Similar to the embodiment shown in FIG. 3, the transmitter 50*a* and receiver 50*b* are placed in housings with fluid, such as air, directed from the housings impinging on the sheet 52 to maintain the transmitter 50*a* and the receiver 50*b* at a constant distance apart from the sheet 52.

Figure 6A:
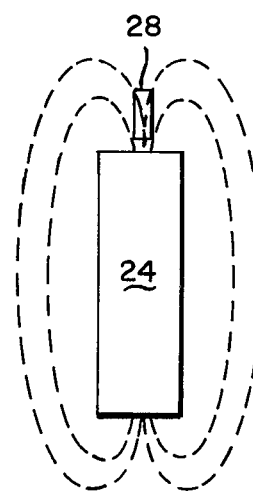
FIG. 6A is a schematic view of the operation of the caliper gauge of FIG. 3.
Figure 6B:
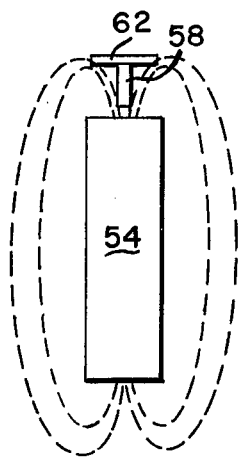
FIG. 6B is a schematic view of the operation of the caliper gauge of FIG. 5.

All of the advantages, previously discussed for the caliper gauge 20 as shown in FIG. 3, are also present in the caliper gauge 50 as shown in FIG. 5, i.e. measure sheets with large thickness values, axial symmetry, vary the strength of the magnetic field as sheets with different thickness values are measured, etc. However, in addition, the advantage of the caliper gauge 50 of FIG. 5 is its greater sensitivity to measurement at small distance. This is shown in FIGS. 6A and 6B. FIG. 6A is a schematic drawing of the caliper gauge 20 of FIG. 3. FIG. 6A shows a transmitter 24 and a receiver 28. The magnetic field lines are shown as dotted lines. From FIG. 6A it is seen that the receiver 28 intercepts only a portion of the magnetic field lines. In FIG. 6B it is seen that the receiver comprising the member 58 and the disk 62 intercepts a greater portion of the magnetic field lines emanating from the transmitter 54. The disk 62 aids the member 58 in intercepting a larger portion of the magnetic lines. Thus, a great signal is produced for small distance measurement.

It is in theory possible to have the caliper gauge 20 perform as well as the caliper gauge 50 for small distance measurements. This can be accomplished by increasing the diameter of the receiver 28 as large as the diameter of the transmitter 24. However, this would necessitate a large receiver. Moreover, for large distance measurements the diameter of the receiver 28 is almost inconsequential, i.e. a cylinder with a small diameter would intercept almost as much magnetic field as a cylinder with a large diameter. This is because the angle intercepted would be small. What is accomplished by the addition of the disk 62 to the member 58 is to make the receiver 50*b* sensitive to measurement at a wide range of distances - without the need to make a receiver with a large cylinder. A receiver with a large cylinder would be more massive than the receiver 50*b* of FIG. 5. Since the receiver 20*b* or 50*b* is supported on air bearings, the reduction in mass without loss of sensitivity is significant.

What is claimed is:

1. An apparatus for non-contacting measurement of the thickness of a sheet of a non-magnetic material comprising:

a first body of a magnetically susceptible material, substantially cylindrical in shape, to one side of said sheet; said first body aligned such that the axis of the cylinder is substantially perpendicular to said sheet;

a first electrical wire wound a plurality of times about said first body, capable of being energized to produce a magnetic field;

means for holding said first body at a constant distance apart from said sheet;

a second body of a magnetically susceptible material, substantially cylindrical in shape, having a diameter less than the diameter of the first body, to other side of said sheet; said second body positioned such that the axis of the cylinder is substantially aligned with the axis of the first body;

a member of magnetically susceptible material, substantially disk shaped, attached to said second body with said second body between said member and said sheet and with the center of said member substantially aligned with the axis of said second body and having a diameter larger than that of the second body;

a second electrical wire wound a plurality of times about said second body, said second wire capable of detecting the amplitude of said magnetic field, said field detected determinative of the thickness of said sheet; and means for maintaining said second body at a constant distance apart from said sheet.

2. The apparatus of claim 1 further comprising a first housing; and said first body in said first housing.

3. The apparatus of claim 2 further comprising a second housing; and said second body in said second housing.

4. The apparatus of claim 3 wherein said holding means is a constant flow of fluid directed from said first housing impinging on said sheet.

5. The apparatus of claim 4 wherein said maintaining means is a constant flow of fluid directed from said second housing impinging on said sheet.

* * * * *